United States Patent
Lecha et al.

(10) Patent No.: US 7,684,404 B1
(45) Date of Patent: Mar. 23, 2010

(54) ASYNCHRONOUS TRANSFER MODE (ATM) CELL FORMATTING

(75) Inventors: Eduard Lecha, Fremont, CA (US); Ramji Pankhaniya, Cupertino, CA (US); Tein-Yow Yu, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1175 days.

(21) Appl. No.: 10/866,125

(22) Filed: Jun. 10, 2004

(51) Int. Cl.
- *H04L 12/28* (2006.01)
- *H04L 12/56* (2006.01)
- *H01J 3/16* (2006.01)
- *H01J 3/22* (2006.01)

(52) U.S. Cl. .................. 370/395.1; 370/466
(58) Field of Classification Search ............ 370/395.1
See application file for complete search history.

(56) References Cited

U.S. PATENT DOCUMENTS

| | | | | |
|---|---|---|---|---|
| 5,568,482 A * | 10/1996 | Li et al. | ............ | 370/471 |
| 6,014,694 A * | 1/2000 | Aharoni et al. | ............ | 709/219 |
| 6,052,383 A * | 4/2000 | Stoner et al. | ............ | 370/466 |
| 6,069,876 A * | 5/2000 | Lander et al. | ............ | 370/249 |
| 6,157,645 A * | 12/2000 | Shobatake | ............ | 370/395.41 |
| 6,633,566 B1 * | 10/2003 | Pierson, Jr. | ............ | 370/395.1 |
| 6,658,021 B1 * | 12/2003 | Bromley et al. | ............ | 370/466 |
| 6,711,168 B1 * | 3/2004 | Yoshizawa et al. | ............ | 370/395.1 |
| 6,765,928 B1 * | 7/2004 | Sethuram et al. | ............ | 370/476 |
| 6,920,156 B1 * | 7/2005 | Manchester et al. | ............ | 370/522 |
| 7,286,566 B1 * | 10/2007 | Parruck et al. | ............ | 370/474 |
| 2002/0015412 A1* | 2/2002 | Czerwiec et al. | ............ | 370/395.6 |
| 2002/0019245 A1* | 2/2002 | Longoni et al. | ............ | 455/522 |
| 2005/0149651 A1* | 7/2005 | Doak et al. | ............ | 710/52 |

OTHER PUBLICATIONS

Optical Internetworking Forum, System Packet Interface Level 4 (SPI-4) Phase 2 Revision 1: OC-192 System Interface for Physical and Link Layer Devices, Oct. 15, 2003.*

* cited by examiner

*Primary Examiner*—William Trost, IV
*Assistant Examiner*—Andrew Chriss
(74) *Attorney, Agent, or Firm*—Blakely, Sokoloff, Taylor & Zafman LLP

(57) ABSTRACT

A method for formatting ATM cells compliant with SPI-4 Phase 2 specification is presented. The method enables selection among various cell formats depending on the devices employed, and enables use of a payload-only test format, a typical format having payload and header data, a format having header error correction (HEC) data and dummy data, and a format having HEC data and user data.

16 Claims, 4 Drawing Sheets

ASYNCHRONOUS TRANSFER MODE (ATM) CELL FORMATTING

BACKGROUND OF THE INVENTION

1. Field of the Invention

The present invention relates generally to the field of high speed data transfer, and more specifically to cell formatting for the asynchronous transfer mode (ATM) in accordance with the SPI-4 phase 2 specification.

2. Description of the Related Art

Data communication networks receive and transmit ever increasing amounts of data. Data is transmitted from an originator or requester through a network to a destination, such as a router, switching platform, other network, or application. Along this path may be multiple transfer points, such as hardware routers, that receive data typically in the form of packets or data frames. At each transfer point data must be routed to the next point in the network in a rapid and efficient manner.

Data transmission over fiber optics networks may conform to the SONET and/or SDH standards. As used herein, the SONET/SDH concepts are more fully detailed in various ANSI, ITU, and ITU-T standards, including but not limited to the discussion of SPI-4, Phase 2, in the Optical Internetworking Forum (OIF Document) OIF-SPI4-02.1 and ITU-T G.707 2000, T1.105-2001 (draft), T1.105.02-1995, and ITU-T recommendations G.7042 and G.707.

SPI-4 Phase II is an interface for packet and cell transfer between a physical layer (PHY) device and a link layer device, for aggregate bandwidths of OC-192 ATM and Packet over SONET/SDH (POS), as well as 10 Gb/s Ethernet applications.

The problem with the current interface scheme for ATM mapping over SONET/SPI-4 Phase 2 is that different devices employing the ATM mapping may have different requirements for data transmission. Certain devices can benefit from test modes, while other devices have uniform size payloads but employ different types of overhead data or administrative data. With odd sized data, transmission over the SPI-4 Phase 2 16 bit bus may present problems, such that a uniform cell format may require the transmitting entity to omit data or the transmission process itself may truncate data or provide an error indication in the case of a data mismatch, i.e. when more or less data is transmitted than fits across the interface. Any such truncation or error indication is highly undesirable.

Further, certain test modes may be employed, such as for purposes of evaluating system performance, where it may be desirable to omit data or otherwise transmit random payloads or data over the network. This data must also conform to the 16 bit bus requirement, or the result may be a loss of data or error indication.

A design that provides a cell format or set of cell formats may enable straightforward transmission of data in common formats so that different devices can be employed while simultaneously conforming to the SPI-4 Phase 2 standard, and particularly the 16 bit bus requirement.

DESCRIPTION OF THE DRAWINGS

The present invention is illustrated by way of example, and not by way of limitation, in the figures of the accompanying drawings in which.

DETAILED DESCRIPTION OF THE INVENTION

The present design provides for a set of cell formats applicable to various situations employing the SPI-4 Phase 2 interface. Cell formats for 52, 53, and 54 byte transmissions are provided, as well as a stripped payload-only test version having 48 bytes. In operation, the system evaluates the devices involved and selects a cell format appropriate for the situation. In all cell formats, data is transmissible over the SPI-4 Phase 2 16 bit bus.

Figure 1:
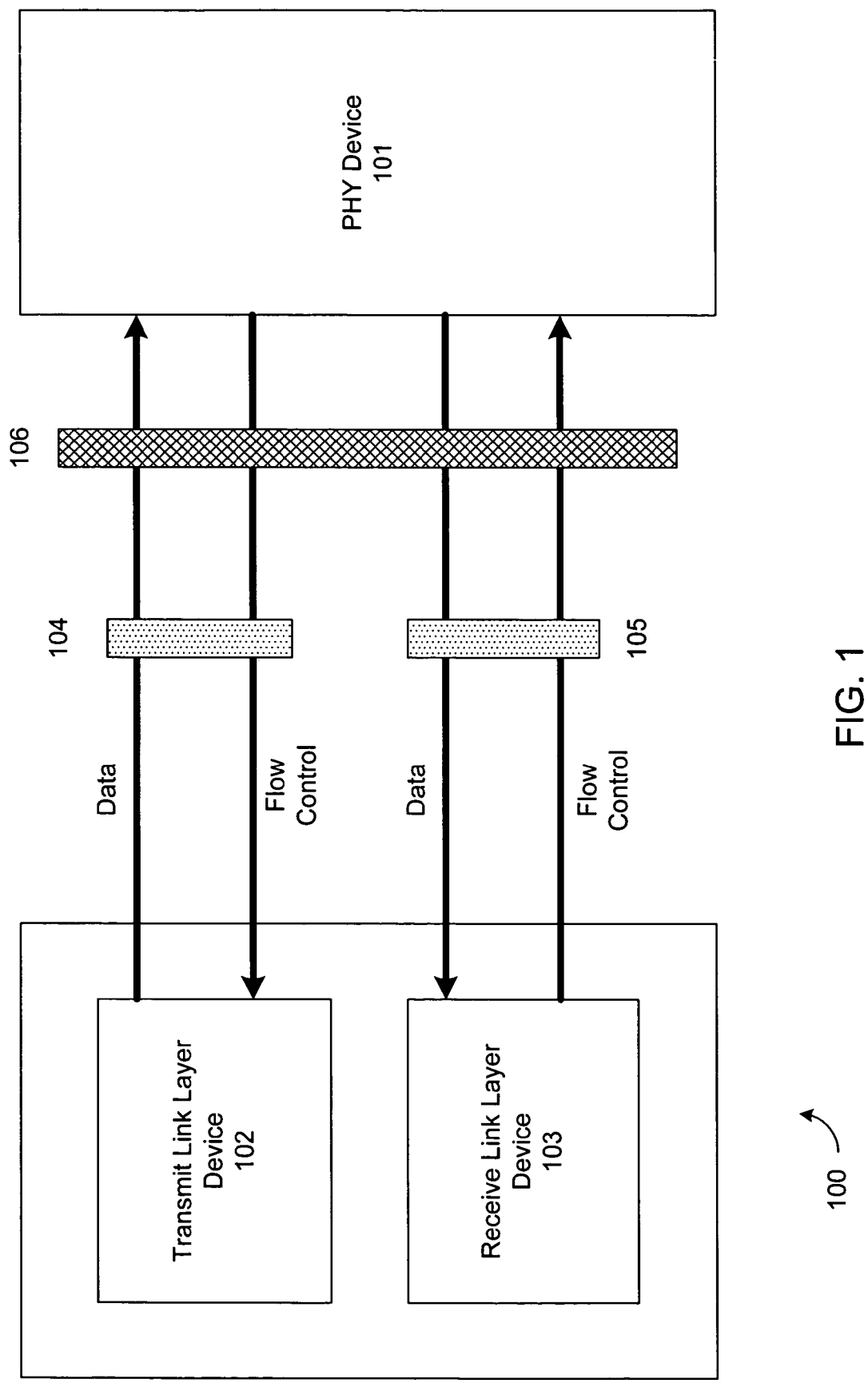
FIG. 1 is a conceptual illustration of a SONET/SDH system data flow model in accordance with SPI-4 Phase 2.

SPI-4 Phase 2 is an interface for packet and cell transfer between a physical layer (PHY) device and a link layer device, for aggregate bandwidths of OC-192 ATM and Packet over SONET/SDH (POS), as well as 10 Gb/s Ethernet applications. FIG. 1 illustrates a conceptual interface diagram between the PHY device 101 and the transmit link layer device 102 and receive link layer device 103. Within system 100, data flows from transmit link layer device 102 through the transmit interface 104 and in SPI-4 Phase 2 format to the PHY device 101, and flow control flows from the PHY device in SPI-4 to transmit interface 104 to transmit link layer device 102. Receive link layer device receives data from receive interface 105 via SPI-4 compliant PHY device 101 data. Flow control originates at receive link layer device 103 and passes through the receive interface 105 to SPI-4 format and PHY device 101. SPI-4 offers point to point connectivity, such as between a single PHY and a single link layer device, and supports 256 ports, suitable for STS-1 in SONET/SDH applications. The transmit/receive data path is 16 bits wide.

Figure 2:
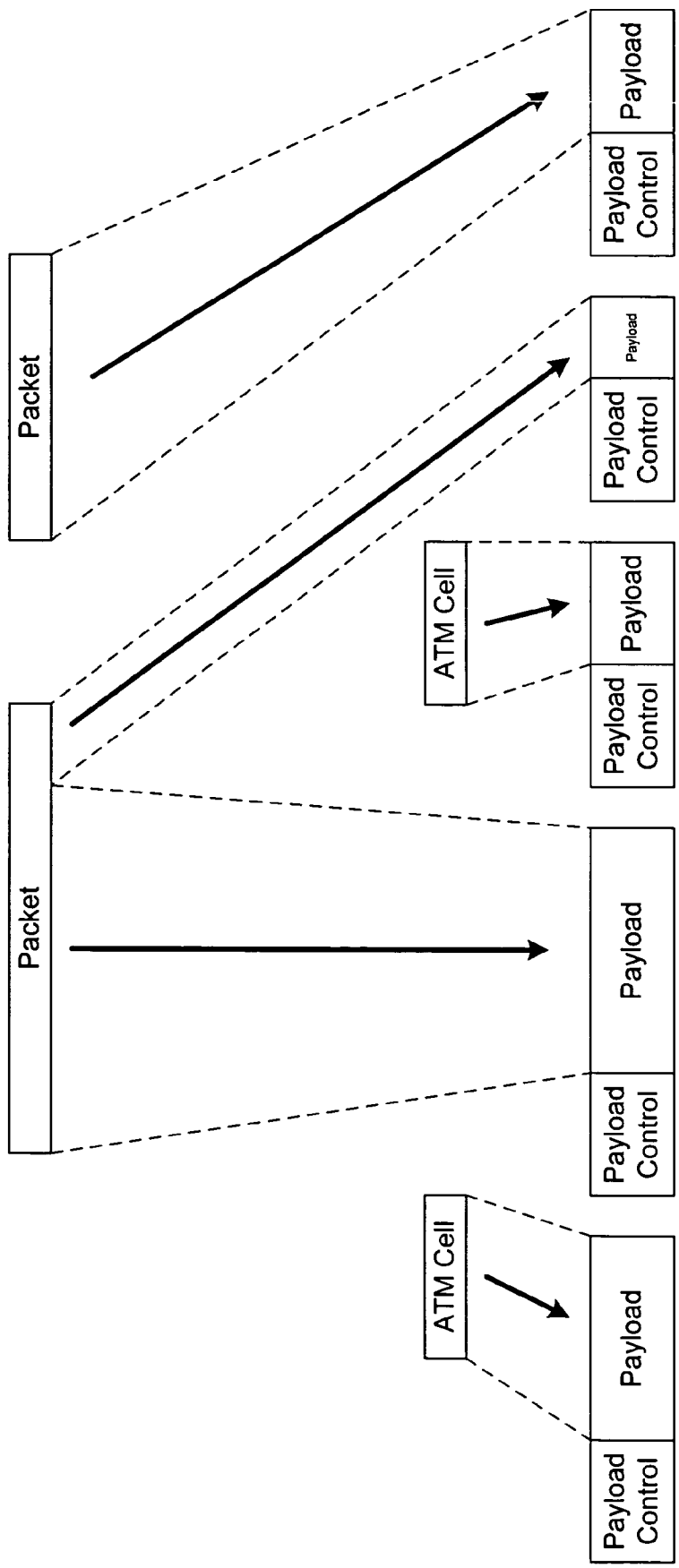
FIG. 2 illustrates the SPI-4 mapping of packets and ATM cells onto a payload stream.

Data is transferred in SPI-4 Phase 2 operation in bursts having a provisionable maximum length and either a fixed or a provisionable minimum length. Both the minimum and maximum burst transfer lengths are typically multiples of 16 bytes. The actual burst transfer length is typically a multiple of 16 bytes, with the exception of transfers that terminate with an EOP (end of packet indication). The system sends information associated with each transfer (port address, start/end-of-packet indication and error-control coding) in 16-bit control words. FIG. 2 shows a mapping of ATM cells and variable-length packets onto the data stream.

The format used to transfer ATM cells across the interface has not been established. When the network transfers ATM cells from an ATM-layer device, such as a network processor, to an ATM physical layer device, such as a mapper of ATM data over SONET, various possibilities for ATM cell format may be employed.

The present design uses four different implementations to map ATM cells into SONET/SDH payloads. The different formats can be employed based on desired configuration.

Figure 3:
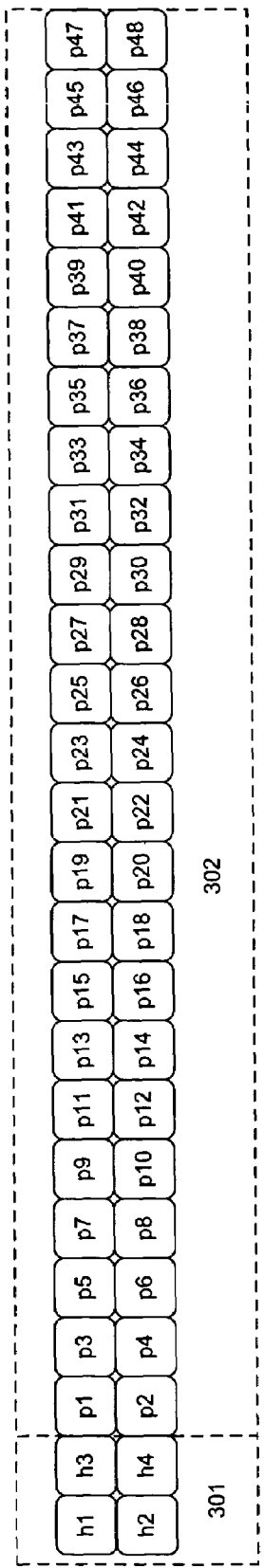
FIG. 3 shows an SPI-4 52 byte payload and header cell format.

FIG. 3 shows a transferred cell comprising a four byte header 301 and the 48 byte payload 302. The total length for the arrangement illustrated in FIG. 3 is 52 bytes, which fits exactly into the 16 bit bus. As shown in FIG. 3, the header 301 comprises stacked bytes, specifically two bytes of data h1 and h3 atop two additional bytes of data, h2 and h4. The payload comprises twenty four bytes of data atop twenty four additional bytes of data in this arrangement.

Figure 4:
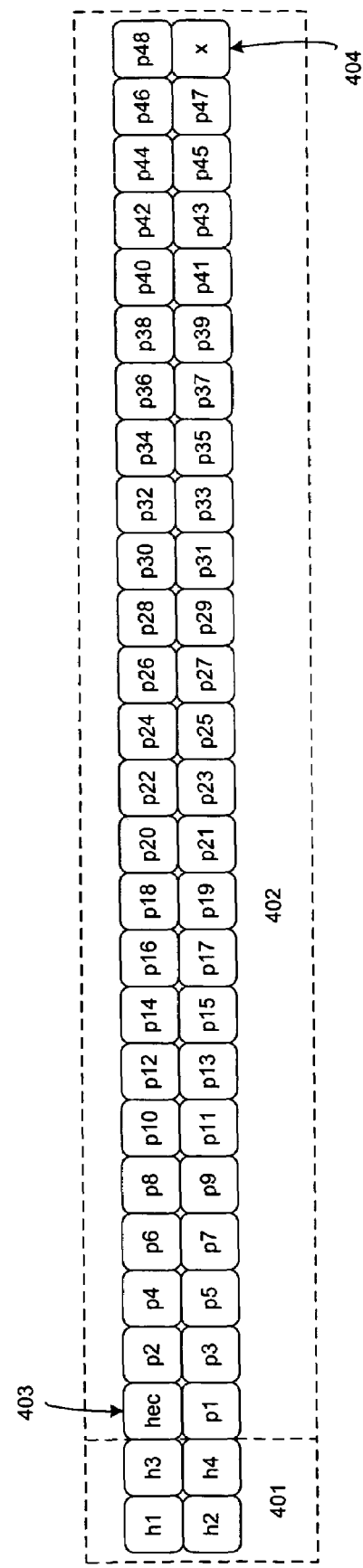
FIG. 4 is an SPI-4 53 byte payload, header, HEC and dummy data cell format.

FIG. 4 illustrates a full 53 byte cell for transfer, including the aforementioned four byte header 401, the 48 byte payload 402, as well as the header error control byte (HEC) 403. Presence of the HEC 403 unbalances the cell, where unbalancing means that the cell will not readily be transmissible over the 16 bit bus. In such a situation, the system adds a dummy byte 404 to balance the cell and enable 16 bit bus transmission.

Figure 5:
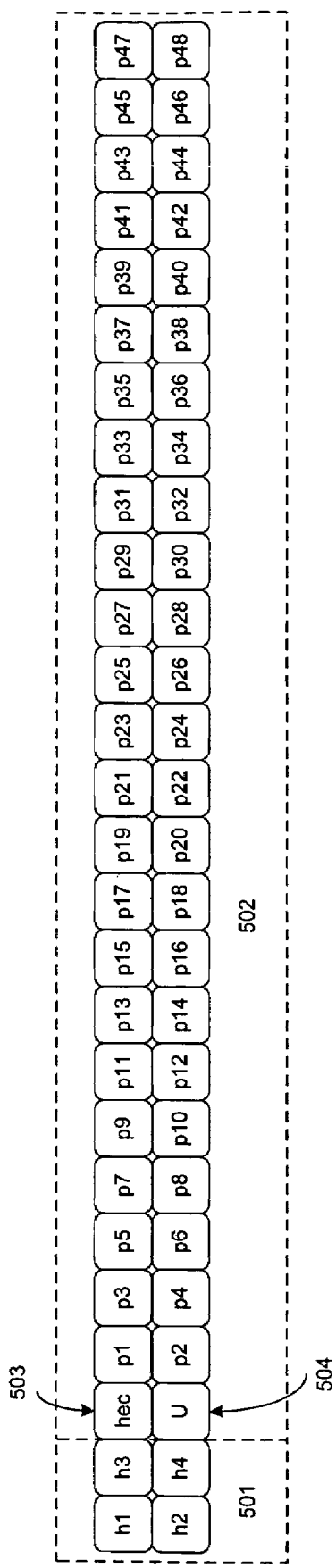
FIG. 5 illustrates an SPI-4 54 byte payload, header, HEC, and user data cell format.

FIG. 5 shows an alternate construction employing the previously mentioned four byte header 501, the 48 byte payload 502, as well as the header error control byte (HEC) 503 and user data 504. The present configuration orders the header 501 first, followed by the HEC 503 atop the user data 504, and the payload 503 last. Again, with this 54 byte cell format, the information fits across the 16 bit bus. In this implementation, the user data 504 is one byte of data employed in the transmit direction to enable insertion of an error mask In certain circumstances, it may be useful to only transfer the payload without transferring the header data or other overhead or associated data. Such a payload transfer mechanism can be employed in test situations, where a fixed or constant header is inserted at the physical layer device or stripped out by the physical layer device. In such an arrangement, the payload may be generated or analyzed on the other side of the interface using a PRBS (pseudorandom bit sequence) generator.

Figure 6:
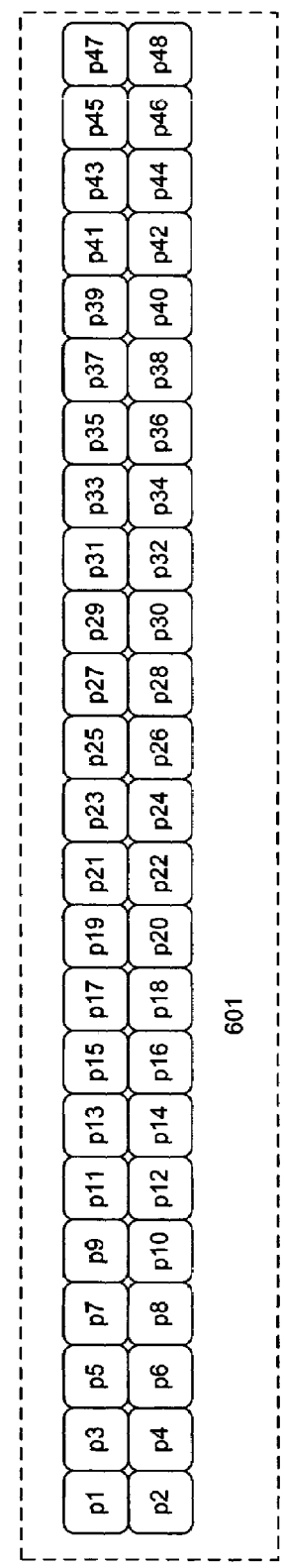
FIG. 6 is a SPI-4 48 byte cell format used primarily for testing purposes.

FIG. 6 illustrates the cell format for transmission of only payload data, and shows the construction of the stripped 48 byte cell all-payload format. From FIG. 6, only payload 601 is available and transmitted, and this arrangement fits across the 16 bit bus and can be processed for testing or other appropriate data subsequent to transmission.

In operation, the network may evaluate the devices operating in the SPI-4 Phase II environment. If a device is employed that requires HEC data, the 53 byte or 54 byte implementation may be employed. If a device is employed that requires HEC data and user data, the 54 byte implementation may be employed. If no device uses either HEC or user data, the 52 byte implementation may be employed. If testing is being performed or to be performed, the 48 byte cell format may be employed. Thus the system may perform an initial evaluation and set the cell format based on the components used, or this may be known to the operator or hardware installer and the format set at initial startup.

It will be appreciated to those of skill in the art that the present design may be applied to other systems that perform data processing, and is not restricted to the communications structures and processes described herein. Further, while specific hardware elements and related structures have been discussed herein, it is to be understood that more or less of each may be employed while still within the scope of the present invention. Accordingly, any and all modifications, variations, or equivalent arrangements which may occur to those skilled in the art, should be considered to be within the scope of the present invention as defined in the appended claims.

What is claimed is:

1. A method for formatting asynchronous transfer mode data for transmission between devices, comprising:
    assessing, in a network, the data transmission requirements of a receiving ATM physical layer device for receiving a transfer of an ATM cell from a transmitting ATM-layer device over a system packet interface (SPI), and based on the assessing, selecting, in the network, an appropriate cell format for transmitting the ATM cell to the receiving physical layer device, wherein selecting the appropriate cell format is from a plurality of cell formats comprising:
    a fixed size header and a fixed size payload;
    the fixed size header, a header error control component, the fixed size payload, and a dummy component; and
    the fixed size header, the header error control component, a user component, and the fixed size payload, wherein the header and payload comprise stacked bytes, wherein the stacked bytes are a sequential arrangement of bytes in which two consecutive bytes in the sequential arrangement of bytes are ordered to fit across a transmission bus in accordance with the SPI.

2. The method of claim 1, wherein the plurality of cell formats further comprises the fixed size payload exclusive of any fixed size header.

3. The method of claim 2, wherein the assessing comprises the network determining whether the data transmission requirements of the receiving ATM physical layer device includes performing testing, in which case the selected appropriate cell format is the fixed size payload exclusive of any fixed size header.

4. The method of claim 1, wherein the assessing comprises the network determining whether the data transmission requirements of the receiving ATM physical layer device comprises requiring user data, in which case the selected appropriate cell format is the fixed size header, the header error control component, a user data, and the fixed size payload.

5. The method of claim 1, wherein the assessing comprises the network determining whether the data transmission requirements of the receiving ATM physical layer device comprises requiring header error control (HEC) data, in which case the selected appropriate cell format is the fixed size header, the header control component, the fixed size payload, and the dummy component.

6. The method of claim 5, wherein assessing further comprises the network determining no user data is required by the receiving ATM physical layer device.

7. The method of claim 1, wherein the assessing comprises the network determining no header error control data is required by the receiving ATM physical layer device, in which case the selected appropriate cell format is the fixed size header and the fixed size payload.

8. A method for selecting a cell format for use in transmitting asynchronous transfer mode (ATM) data within a high speed communication network using a system packet interface (SPI), comprising:
    selecting, in the network, a transmission cell format based on data transmission requirements of a receiving ATM physical layer device in accordance with the SPI, wherein the selected format is one of a 48 byte format, a 52 byte format, a 53 byte format, or a 54 byte format, the selected format comprising at least one of a header data and a payload data, the header and payload data comprising stacked bytes, wherein the stacked bytes are a sequential arrangement of bytes in which two consecutive bytes in the sequential arrangement of bytes are ordered to fit across a transmission bus in accordance with the SPI.

9. The method of claim 8, wherein said 48 byte format comprises solely payload data.

10. The method of claim 9, wherein said payload data is selected when the data transmission requirements of the receiving ATM physical layer device in accordance with the SPI includes being used for testing purposes.

11. The method of claim 8, wherein said 52 byte format comprises header data and payload data.

12. The method of claim 11, wherein header data comprises four bytes and payload data comprises 48 bytes.

13. The method of claim 8, wherein said 53 byte format comprises header data, payload data, header error correction data, and dummy data.

14. The method of claim 13, wherein header data comprises four bytes, payload data comprises 48 bytes, header error correction data comprises one byte, and dummy data comprises one byte that is not counted towards the 53 byte format length.

15. The method of claim 8, wherein said 54 byte format comprises header data, payload data, header error correction data, and user data.

16. The method of claim 15, wherein header data comprises four bytes, payload data comprises 48 bytes, header error correction data comprises one byte, and user data comprises one byte.

* * * * *